INVENTOR
LEO A. BIXBY
BY
*Strauch, Nolan & Diggins*
ATTORNEYS

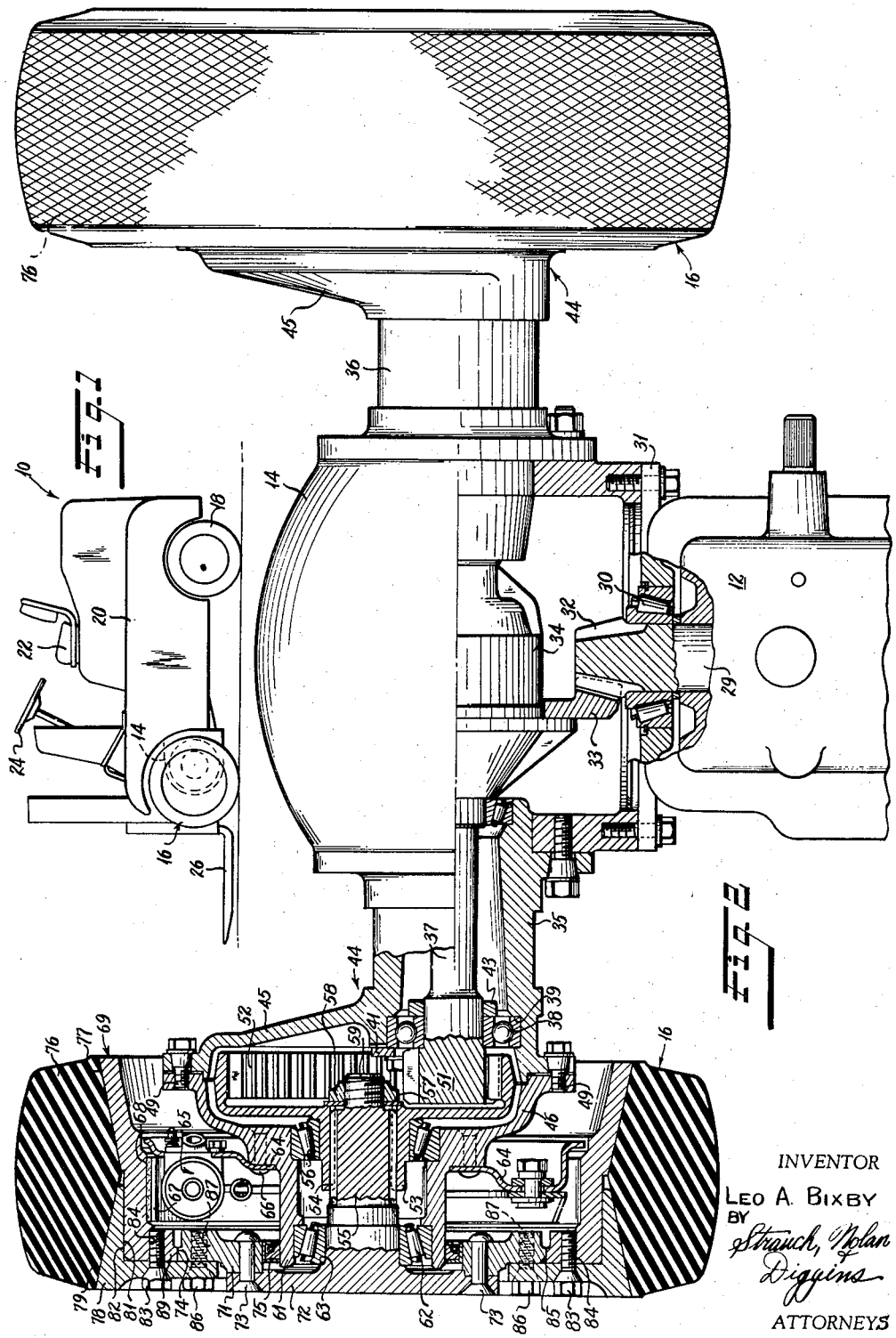

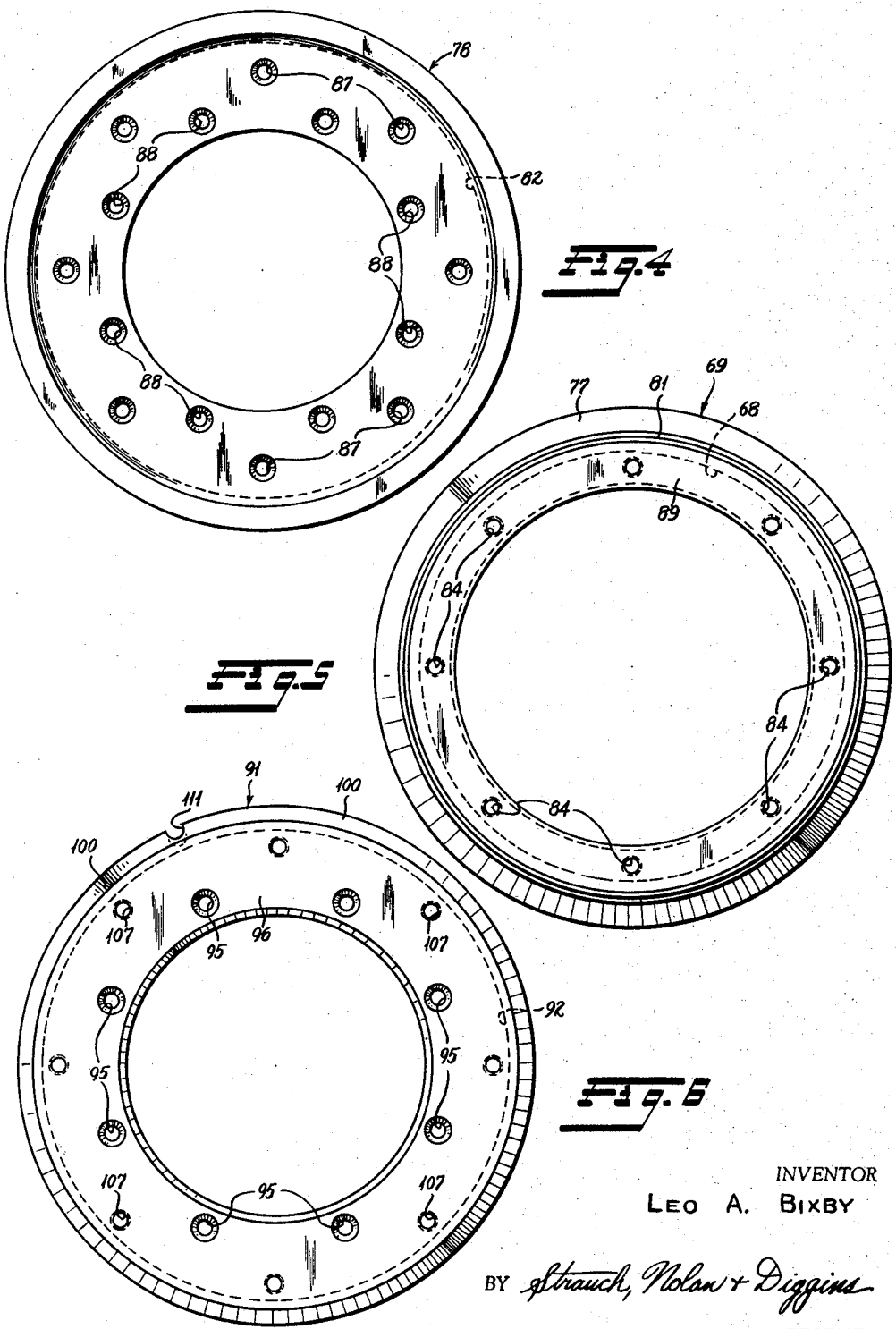

United States Patent Office 2,949,040
Patented Aug. 16, 1960

2,949,040

VEHICLE DRIVE MECHANISM

Leo A. Bixby, Niles, Mich., assignor to Rockwell-Standard Corporation, a corporation of Pennsylvania Filed June 30, 1954, Ser. No. 440,498

2 Claims. (Cl. 74—390)

This invention relates to improvements in drive mechanism for vehicles such as trucks which are adapted at the front end to engage, lift, lower and otherwise manipulate loads, commonly known as lift trucks, and more particularly to the axle assemblies and associated wheel constructions.

An important practical requirement in the design of a lift truck is to have the overall dimensions at a minimum so that it can be used in confined spaces in factories, warehouses, loading docks and the like. The spacings for axles and the transmission on vehicles of this type is therefore extremely limited. Another practical requirement is to have the front wheels contact the floor as far forward on the vehicle and as close to the center of gravity of the load as possible to reduce the tendency of the vehicle to pivot forwardly about the front wheels when heavily loaded. Since the lift must be positioned forwardly of the front wheels, the front wheels should have a small diameter to keep the floor contact point and the center of gravity close together. Due to the small overall dimensions of a vehicle of this type, it is desirable to locate the speed reducing mechanisms as much as possible in spaces not already required by the size and location of other parts. Along with all of the foregoing requirements it is also necessary as a practical matter to provide a wheel assembly which can easily and quickly be disassembled and assembled to repair and replace tires and brake linings without disturbing the adjustments of the moving parts.

This invention relates chiefly to a front wheel drive assembly for the foregoing type vehicles having front drive wheels in which speed reduction gears are located and on which a brake drum and wheel mounting member are readily removable for servicing. The instant invention embodies a novel wheel assembly including a live spindle and wherein the bearings and other running parts are easily and accurately initially adjusted by bench assembly and these adjustments are not disturbed by changing tires or brake drums. The live spindle wheel bearing adjustment may be enclosed within the assembly and therefore is less subject to tampering since the bearing adjusting nut is on the inner end of the live spindle.

A further feature of this invention is a novel wheel structure used in combination with the live spindle which makes possible the interchangeable use of either removable solid rubber tires or pneumatic tires.

Accordingly it is the major object of this invention to provide an improved lift truck axle driving mechanism having a live wheel spindle in each driving wheel.

Another object of this invention is to provide an outer wheel assembly that may be removed for brake servicing without disturbing the bearing adjustment or oil seal and without any dissassembly of the main hubs.

A further object is to provide a wheel mounting hub upon which solid rubber or pneumatic tires may be interchangeably mounted.

A still further object is to provide a tire mounting member which may be readily removed to permit replacing or repair of a tire without removing the entire rim assembly.

A further object of the invention is to provide a lubrication system common to the transmission, transfer gearing and spindle in an axle assembly for a lift truck or the like.

Still another object of the invention is to provide a drive wheel assembly that is compact and easy to assemble which contains novel speed reduction gearing means located inwardly of the braking mechanism.

And a still further object is to provide a drive wheel assembly having a bearing adjustment located at the inward part of the live spindle to prevent unnecessary tampering.

A further object of the present invention is to provide a novel wheel structure having a spindle and a ring gear assembly journalled on spaced bearings so that the load line through the wheel structure passes substantially midway between the bearings to thereby assure long bearing life.

Still another object of the present invention is to provide a novel wheel structure having a rotatable spindle, a gear provided with a hub extension that non-rotatably receives one end of the spindle, a bearing rotatably mounting the opposite end of the spindle and a bearing rotatably mounting the gear hub extension directly on a housing so as to rotatably support the one end of the spindle joined to the hub extension at a point located along its longitudinal axis that is axially coincident with the rigid connection between the gear hub extension and the spindle to reduce the tendency of the spindle to bend under application of loads thereto with a corresponding reduction in the tendency of the gear to cock relative to a second meshing gear and thereby assure long gear life.

These and other objects of the invention will become more fully apparent by reference to the attendant claims and the following detailed description of the accompanying drawings wherein:

Figure 1 is a side elevation view of an industrial lift truck embodying the principles of the present invention;

Figure 2 is a top plan view partially broken away and in section of a front drive axle and wheel drive assembly according to a preferred embodiment of the present invention;

Figure 4 is a front view of the wheel rim member of Figure 2;

Figure 5 is a front view of the wheel member of Figure 2; and

Figure 6 is a front view of the wheel member of Figure 3 which is used for pneumatic tires.

Figure 3:
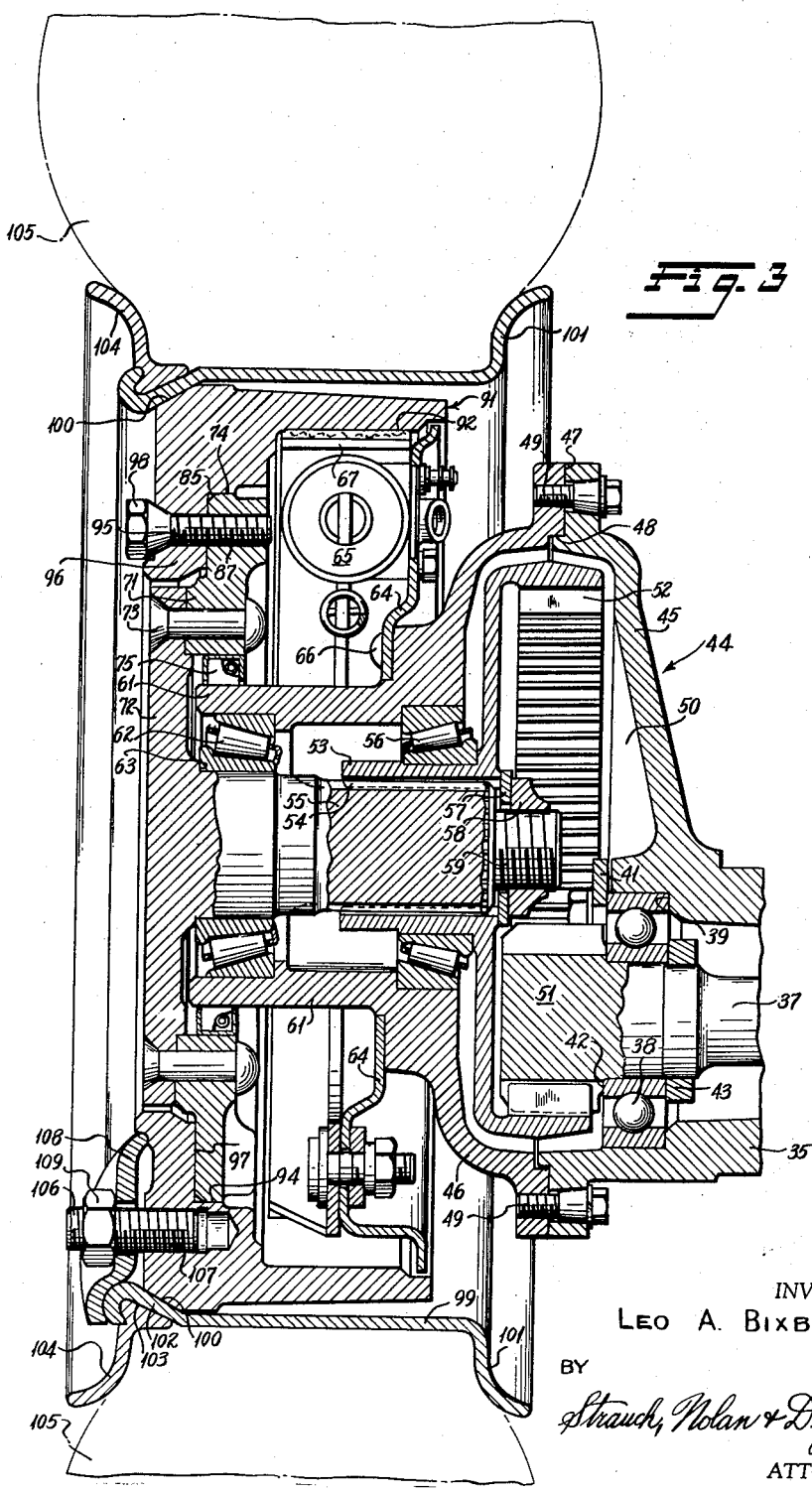
Figure 3 is an enlarged plan view in section of the wheel drive mechanism of Figure 2 but showing pneumatic tires instead of solid tires on the wheel.

Referring now to the drawings and more particularly to Figures 1 and 2, the shop lift truck 10 has a variable speed transmission housing 12, a differential housing 14 which is the center section of the front axle, front driving wheels 16, rear dirigible wheels 18, a body 20, a seat 22, a steering wheel 24, a lift fork 26 and also includes the other conventional features of such a vehicle such as the engine, clutch and variable speed transmission gearing (not shown).

Referring to Figure 2, the transmission output shaft 29 projects from transmission housing 12 and is journalled in bearings 30 in differential housing cover plate 31. A hypoid pinion gear 32 on shaft 29 is meshed with hypoid gear 33 fixed upon a conventional differential cage 34. Axle housing arms 35 and 36 extend from the differential housing center section to the wheel assemblies. Since the corresponding members of the wheels including the brakes, the axle shaft and the axle outer end gear reductions are the same and interchangeable left to right, the description of a part or combination of parts on one side will suffice for the other.

Axle shaft 37 projects from one side of the differential 34 through axle housing arm 35 and is supported at its wheel end by a suitable bearing 38 having its outer race seated in a counterbore in the end of arm 35 axially fixed between housing shoulder 39 and a clamp plate 41 bolted to the axle housing arm. The inner race of bearing 38 abuts shaft shoulder 42 on one side and a ring 43 suitably fixed to the shaft on the other side.

An enlarged rigid reduction gear housing 44 is provided at the outer end of each axle housing arm and as illustrated in Figure 3 one side of this housing is formed by the integral extension 45 of the outer end of axle housing arm 35 and the other side of this housing is a dish-shaped member 46. The housing sides have abutting peripheral faces lying in a vertical plane as indicated at 47 and interfit with a piloted shoulder and recess connection indicated at 48, and when secured together by bolts 49 they enclose a reduction gear space 50.

Shaft 37 extends into space 50 where it is formed with an integral spur pinion 51 which constantly meshes with an internal ring gear 52, the axis of rotation of ring gear 52 being spaced forwardly of the axis of axle shaft 37. Gear 52 has an integral hub 53 internally splined at 54 to a live wheel spindle 55. Gear hub 53 is supported by a roller thrust bearing 56 having its outer race seated in a counterbore in housing member 46 and its inner race fixed on hub 53 in abutment with the side of gear 52. A washer 57 surrounds the spindle and is clamped against the other side of gear 52 when nut 58 is tightened on the threaded spindle end 59.

Housing member 46 is formed with an integral outwardly extending boss 61 surrounding the spindle, and a roller thrust bearing 62 seated in a counterbore in the outer end of this boss rotatably supports the outer end of spindle 55. This inner race of bearing 62 is pressed upon spindle 55 and abuts a radial shoulder 63 on the spindle.

Brake backing plate 64 supports a conventional brake mechanism assembly 65 and is fixed to housing member 46 as by rivets 66. Brake shoes 67 are expansible to engage cylindrical brake drum surface 68 of a tire mounting wheel member 69 in Figure 2 where solid tires are used.

A wheel adapting member 71 is permanently fastened to the spindle outer end flange 72 as by rivets 73 and has an external cylindrical periphery 74 snugly piloted within a corresponding internal cylindrical surface of wheel 69. An oil seal 75 is provided between housing boss 61 and the wheel adapting member 71.

Solid rubber tires 76 which may be of the type known as the "Innacush" type having an inclined side inner periphery are mounted on wheel member 69 with an inclined side of the inner periphery seated on inclined surface 77 of the wheel member. Wheel rim member 78 has a tire mounting surface 79 inclined oppositely to surface 77 and an internal cylindrical surface 81 which fits slidably over cylindrical wheel surface 82. When bolts 83 which are threaded in bores 84 of the wheel 69 are drawn tight, the tire 76 is secured upon wheel member 69 and radial flange 89 of the wheel rim member 78 is moved into abutment with the flat outer sides of wheel member 69 and wheel adapting member 71. Inclined surface 85 at the outer corner of member 71 aids assembly of the wheel 69 upon the adapter member. Inner bolts 86 are threaded in bores 87 of adapter 71.

Referring to Figure 4, wheel rim member 78 has two rows of bolt holes on concentric circles, outer row 87 for bolts 83 and inner row 88 for bolts 86.

In Figure 5 the outer side of wheel rim 69 is shown and it is noted that flange 89 thereof has only one row of threaded bolt holes 84 aligned with row 87 of Figure 4. Thus by removing bolts 86 the entire wheel assembly consisting of wheel member 69, tire 76 and rim member 78 may be removed for brake servicing without disturbing the bearing adjustment effected by nut 58 or the oil seal at 75 and without disassembly of the spindle or reduction housing.

To assemble the wheel units of Figure 2 with the axle, the brake backing plate 64 is first mounted on the housing member 46. The conventional brake mechanism may then be mounted on the backing plate. The outer races of bearings 56 and 62 are then pressed into place on housing member 46 and oil seal 75 is placed in position on the housing. Then spindle 55 to which adapter 71 has previously been riveted is inserted into position in housing member 46, and hub 53 of internal gear 52 is forced into splined engagement with spindle 55. Washer 57 and nut 58 are then placed in position on the threaded spindle inner end to complete the outer end unit sub-assembly. Bearing adjustment nut 58 is adjusted as an accurate sub-assembly bench adjustment in the factory. This adjustment is substantially semi-permanent and not readily subject to unauthorized tampering since nut 58 is within space 50 where it is relatively non-accessible.

The foregoing sub-assembly is applied as a unit to the axle housing outer end section 45, and housing member 46 secured to housing section 45 by studs 49 and with gear 52 mashed with the axle shaft pinion 51. The previously assembled tire and rim sub-assembly of members 69 and 78 secured together by bolts 83 may then be mounted over adapter 71 and secured thereto by bolts 86. Sloped surface 85 of adapter 71 aids in mounting the wheel assembly by guiding member 69 to its proper position on adapter 71.

Figure 3, wherein the same numbers indicate the same parts as in Figure 2, illustrates the wheel construction where pneumatic tires are employed and Figure 6 illustrates the wheel member 91 which is therein embodied. Wheel member 91 has a cylindrical brake drum surface 92 for coaction with the brake shoes 67, and is formed with an internal cylindrical surface 94 which snugly surrounds the cylindrical surface 74 of spindle flange adapter 71.

Wheel member 91 is formed with a circumferential series of bolt holes 95 in a radial flange 96 that has a flat inner face 97 intersecting cylindrical surface 94, and in the assembly a series of bolts 98 which may be the same as bolts 86 enter threaded bores 87 to secure wheel member 91 rigidly to adapter 71, with flat surface 97 abutting the flat side of adapter 71 as shown in the upper part of Figure 3.

The lower part of Figure 3 shows how the tire rim 99 is removably mounted on wheel member 91 which has an outer inclined annular face 100. Rim 99 has an inner circumferential side flange 101, an inclined outer section 102 which surrounds wheel surface 100 and thus limits inward axial displacement of the rim 99, and an outwardly open recess 103 which receives a ring 104 shaped like flange 101 to engage the outer side of tire 105. A plurality of studs 106 are mounted in a circumferential row of threaded holes 107 and pass freely through a series of lugs 108 that are tightened by nuts 109 to clamp the rim 99 upon wheel member 91 and prevent outward axial displacement of the rim. A channel 111 (Figure 6) permits passage of the valve stem of the tire tube (not shown).

The tires may be dismounted merely by removing nuts 109 and lugs 108, without removing the wheels. The wheels 91 may be dismounted without removing the tires, by removing bolts 98.

The wheel members 91 and 69 are interchangeable, so that a quick shift from solid to pneumatic tires is possible and the inventory costs in both the factory and field are held at a minimum. The shift from one type of wheel to the other does not involve any disturbance to bearing adjustments or to the oil seal arrangements. Both wheels attach to the same adapter 71.

Furthermore a single lubrication system for the transmission, differential, wheel bearings and the outer end reduction gearing is provided since the oil is contained by and is circulated through the space enclosed by housing 12 and axle housing sections 14, 35, 36, 45 and 46.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a drive axle assembly, a hollow axle housing having an enlarged outer end serving as one side of a reduction gear housing, a housing member serving as the other side of said gear reduction housing removably secured to said axle housing outer end and enclosing a space, a wheel spindle journaled in said housing member so that one end thereof extends into said space and having a wheel mounting flange outside the reduction gear housing, a ring gear, bearing adjustment means enclosed in said space and including an adjusting nut threadedly secured to the end of said spindle extending into said space to provide for adjustment of said bearing and positioned for exposure by detachment of said housing member from said axle housing, an axle shaft extending through the axle housing, and a gear on said axle shaft constantly meshed with said ring gear.

2. In a heavy duty drive axle assembly, a hollow axle housing having an enlarged outer end serving as one side of a reduction gear housing; a housing member serving as the other side of said gear reduction housing removably secured to said axle housing outer end and enclosing a space, said housing member having an outwardly extending tubular portion outside of said space; an axle shaft extending through said axle housing; a drive gear rigid with said axle shaft and extending into said space; a ring gear within said space constantly meshing with said drive gear and having a hub extending outwardly from said space to the outside of said reduction gear housing in concentric spaced relationship to said housing member tubular portion; a wheel spindle coaxially received through said hub in coaxial spaced relationship to said tubular portion; a wheel mounting flange rigid with said spindle adjacent the outer end thereof and extending outwardly beyond said tubular portion; means for non-rotatably connecting the inner end of said spindle to said ring gear hub; and means between said wheel mounting flange and said space for rotatably supporting said spindle and said ring gear and the load applied thereto through said wheel mounting flange and said axle shaft comprising a first bearing rotatably mounting said ring gear hub directly on said housing member tubular portion to thereby rotatably support the inner end of said spindle received through said hub and a second bearing axially spaced from said first bearing and rotatably mounting said spindle directly on said housing member tubular portion at a position adjacent to and inwardly from said wheel mounting flange.

References Cited in the file of this patent
UNITED STATES PATENTS

| | | |
|---|---|---|
| 1,780,922 | Howe | Nov. 11, 1930 |
| 1,824,793 | Riise | Sept. 29, 1931 |
| 2,162,696 | Burger | June 20, 1939 |
| 2,239,463 | Mills | Apr. 22, 1941 |
| 2,506,671 | Jacobi | May 9, 1950 |
| 2,570,191 | Beckwith | Oct. 9, 1951 |
| 2,776,019 | Keese | Jan. 1, 1957 |